Patented Dec. 30, 1947

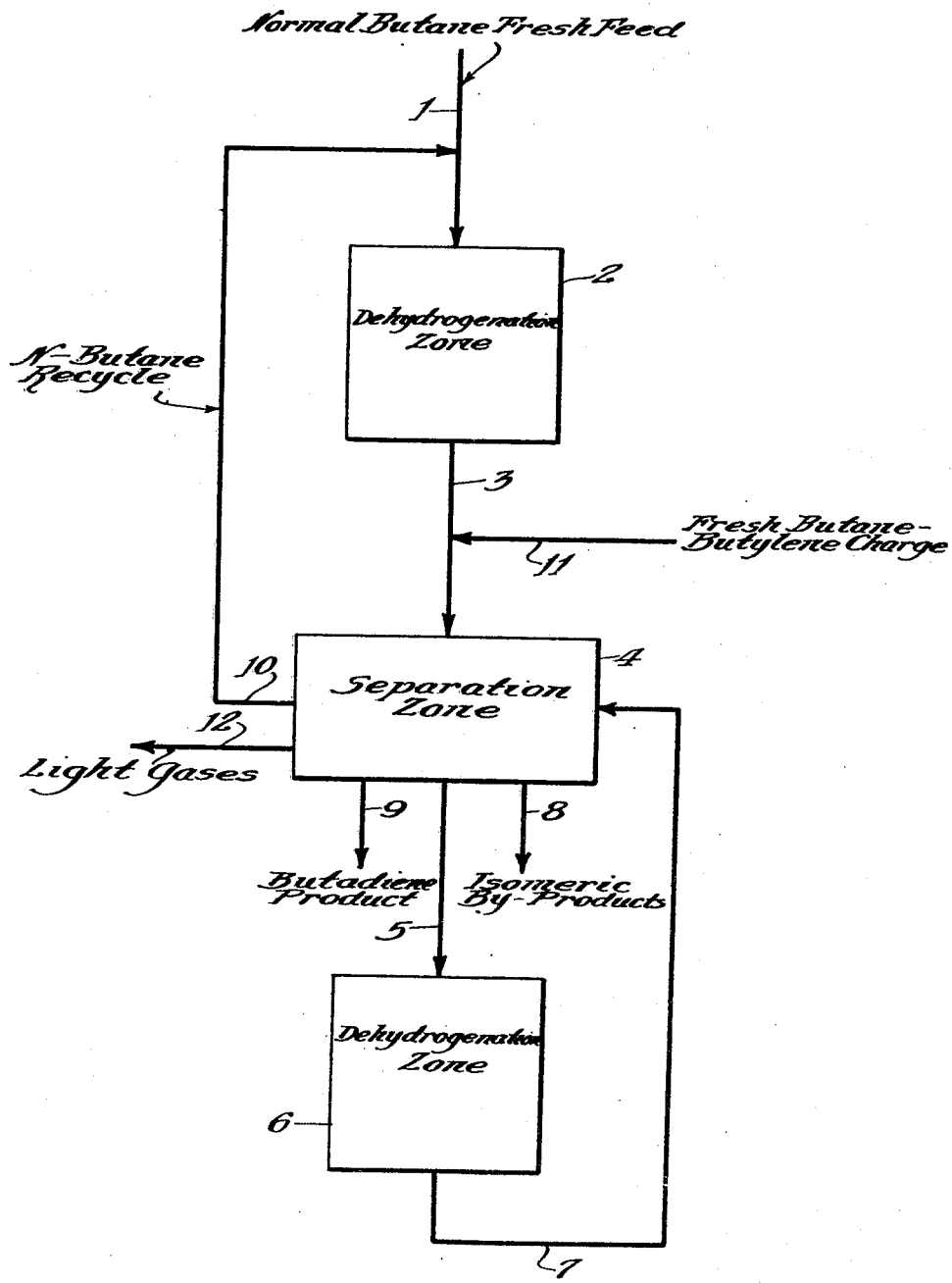

2,433,800

UNITED STATES PATENT OFFICE 2,433,800

PRODUCTION OF BUTADIENE

Charles C. Watson, Chicago, Ill., assignor to Universal Oil Products Company, Chicago, Ill., a corporation of Delaware Application October 29, 1943, Serial No. 508,107

5 Claims. (Cl. 260—680)

This invention relates to the catalytic dehydrogenation of hydrocarbons and is more specifically concerned with the dehydrogenation of normal butane to form butadiene.

Butadiene is extensively employed as the starting material in many organic syntheses and is of considerable value in the production of high molecular weight polymers having physical characteristics similar to natural rubber.

The amount of butadiene used in organic syntheses has been limited to a great extent by the non-availability of a cheap method for producing it from relatively cheap raw materials. The most common method formerly used consisted of starting with acetylene and carrying out various chemical reactions until butylene glycol was obtained which was subsequently dehydrated to butadiene. More recently butadiene has been obtained in commercial quantities in an operation which is economically feasible by the catalytic dehydrogenation of normal butane.

The dehydrogenation of normal butane to butadiene involves the following two reactions:

$$C_4H_{10} \rightarrow C_4H_8 + H_2$$
$$C_4H_8 \rightarrow C_4H_6 + H_2$$

In view of the equations given above, it would be expected that most efficient operation for the production of butadiene from butane would be a two-stage operation in which butane was first converted to butylene and the butylene subsequently converted to butadiene in a separate reaction zone. The prior art best exemplified by Patent #2,209,215 is primarily concerned with this type of operation.

It is an object of the present invention to provide an improved process for the production of butadiene from butane in which the yield of butadiene and the degree of efficiency of the reaction that is obtained is decidedly superior to those obtained by the processes of the prior art.

It is another object of the invention to provide a process which has increased flexibility and which can process satisfactorily any type of butane-butylene charging stock.

I have discovered that contrary to expectations, a more efficient operation which produces more butadiene per unit of butane charged may be obtained by employing a two-stage operation in which normal butane is converted to substantial quantities of butadiene and butylene in the first stage, and the butylenes separated from the reaction products of the first stage are further converted to butadiene in the second dehydrogenation operation. The extent of the improvement obtained by the operation of this invention is clearly shown in the examples included hereinafter in this specification.

In one broad embodiment, the present invention comprises a process for producing butadiene which consists of subjecting normal butane to contact with a dehydrogenation catalyst under conditions such that a substantial quantity of butadiene and butylene is obtained, separating the butylene from the reaction products and further converting the separated butylene substantially free of other C4 hydrocarbons to an additional quantity of butadiene by contact with a dehydrogenation catalyst under dehydrogenation conditions.

In effect, the present invention consists of three units which are cooperatively interrelated to one another. These units are a first stage dehydrogenation unit which produces butadiene and butylene from normal butane, a second dehydrogenation unit wherein the butylene formed in the first stage is dehydrogenated to butadiene and a separation unit wherein the reaction products from both the first and second dehydrogenation units are processed to separate the desired butadiene, the normal butane to be recycled to the first dehydrogenation unit, the butylene to be charged to the second dehydrogenation unit and the by-products such as isobutane and lower molecular weight hydrocarbons such as methane, ethylene, ethane, propylene and propane, which are removed from the system.

I have also found that the cost of separating the butadiene per unit of weight is dependent primarily on the quantity of butadiene being introduced into the separation unit. Increasing the concentration of butadiene entering said unit produces a pronounced decrease in the separation cost. The operation of the present invention takes full advantage of this decrease in separation costs since both dehydrogenation steps are producing substantial quantities of butadiene.

The catalysts which may be employed in the dehydrogenation operations may comprise any of the well known dehydrogenation catalysts such as chromium oxide, molybdenum oxide or vanadium oxide supported by alumina in either the powdered, granular or shaped forms such as pellets or spheres. It is usually desirable when employing these catalysts to incorporate a small amount of magnesia or zinc oxide in the composite to improve the thermal stability of these catalysts. The same catalysts may be used in each stage or different catalysts may be employed in each stage. Catalysts comprising a composite of a major proportion of alumina and minor proportions of barium oxide and potassium oxide or a composite of a major proportion of magnesia and minor proportions of iron oxide, copper oxide and potassium oxide are particularly effective for the conversion of butylene to butadiene, especially if superheated steam is introduced along with the charge to effect a lowering of the partial pressure of the butylene in the reaction zone.

The invention is explained in more detail in connection with the description of the accompanying drawing which illustrates in a conventional diagrammatic flow chart one method of conducting the operation.

Referring to the drawing, normal butane fresh feed along with the recycled normal butane obtained as hereinafter set forth is introduced through line 1 into dehydrogenation zone 2 wherein it is contacted with a dehydrogenation catalyst comprising alumina and chromia at a temperature within the range of about 1050 to about 1250° F. under an absolute pressure of .05 to about 0.5 atmospheres. The charge rate through the reaction zone will be dependent to a certain extent upon the temperature and pressure chosen but will ordinarily be within the range of space velocities of about 200 to about 1000 volumes of gas per volume of catalyst per hour. The actual conditions are selected from these ranges to produce a yield of butadiene of about 10 to 30 volume per cent of the butane charged. The reaction products comprising unconverted normal butane, butadiene and butylene, hydrogen and a small portion of decomposition products such as methane, ethane, ethylene, propane and propylene leave dehydrogenation zone 2 through line 3 and are directed through line 3 into separation zone 4 wherein the light gases, butadiene and butylenes are separated from the unconverted normal butane. The unconverted normal butane is recycled through line 10 into line 1 as hereinbefore set forth. The butadiene along with butadiene formed in dehydrogenation zone 6 as hereinafter set forth is withdrawn from the separation zone through line 9, cooled and collected in any manner well known to those skilled in the art.

Separation zone 4 may comprise any of the well known means for separating $C_4$ hydrocarbon mixtures into the individual $C_4$ hydrocarbons such as precise fractional distillation, solvent extraction and azeotropic distillation with azeotrope-forming materials such as furfural, etc. The separated butylenes are directed from separation zone 4 through line 5 into a second dehydrogenation zone 6 wherein a substantial portion of the normal butylene is converted into butadiene. This dehydrogenation is accompanied by the formation of a minor amount of normal butane from normal butylene.

The operating conditions employed in dehydrogenation zone 6 are dependent to a considerable extent upon the type of catalyst being used in said zone. In the case of composite catalysts such as magnesia, iron oxide, copper oxide and potassium oxide or alumina, boria and potassium oxide heretofore mentioned are employed, superheated steam is introduced into the reaction zone to give a total pressure of about 3 to 50 pounds per square inch gauge while maintaining the partial pressure of the normal butylene at about 0.05 to about 0.5 atmospheres absolute. The temperature utilized in dehydrogenation zone 6 is dependent somewhat upon the catalyst but is ordinarily within the range of about 1050 to 1250° F. at a space velocity measured as volumes of gas per volume of catalyst per hour of about 200 to about 2000. The yield of butadiene per pass is maintained within the range of about 15 to 30 per cent based on the butylenes charged.

During the dehydrogenation reaction in zones 2 and 6, some isomerization occurs producing iso $C_4$ hydrocarbons. Since butadiene cannot be produced from the iso $C_4$ hydrocarbons because of their molecular structure, it is advantageous to remove these isomers from the system to prevent their build-up in the streams being charged to the dehydrogenation catalyst. These isomeric by-products are removed from the separation zone through line 8 and are cooled and condensed and recovered as a product of the reaction. The reaction products from dehydrogenation zone 6 are directed through line 7 into separation zone 4 wherein the desired $C_4$ fractions are removed therefrom.

In case the original charging stock contains $C_4$ olefins in any substantial quantity, this charge may be introduced to line 11 into line 3 through which it is directed into the separation zone and the necessary separation of olefins and paraffins effected, or alternatively, although not shown in the drawing, the charging stock may be introduced directly into the separation zone. The reaction in either dehydrogenation zone may be conducted in either the fluid, fixed or moving bed type of operation. When employing a fixed bed type of operation, the catalyst may be disposed in externally heated tubular elements connected in series or parallel. The external heat may be accomplished by indirect heat exchange by hot combustion gas or other heat-carrying media such as molten salts, superheated steam, etc.

During the dehydrogenation reaction, considerable amounts of carbonaceous materials are laid down upon the catalyst and after the catalyst has been used for some time, it is necessary to remove these carbonaceous deposits to restore the catalyst activity. These carbonaceous materials are ordinarily removed by introducing a heated stream of air or air diluted with combustion gases to burn off the carbonaceous deposit. Although the description of the drawing has been concerned with only two dehydrogenation zones, it is, of course, obvious that for more truly continuous operation, it is necessary to employ at least two reactors for each dehydrogenation operation so that the catalyst in one reactor may be regenerated by oxidation while the other is being processed.

The following examples give comparative results obtained when employing a two-stage operation wherein butane is partially converted to butylene in the first stage and the reaction products from the first stage are charged to the second stage to produce butadiene and a process in accordance with the present invention wherein butane is converted to butadiene and butylene in the first stage and the butylene thus formed subsequently converted to butadiene in the second stage. It is obvious from a study of the data given below that the process as practiced in accordance with the present invention is considerably improved over that of the prior art as to the actual yield of butadiene per pound of butane charged.

Table

| Stage | Example I, Ordinary Operation | | Example II, Improved Operation | |
|---|---|---|---|---|
| | 1 | 2 | 1 | 2 |
| Absolute Pressure, mm. Hg | Atmos. | 80 | 80 | 80 |
| Catalyst Temp., °F | 1,100 | 1,175 | 1,175 | 1,175 |
| Conversion,[1] Mol per cent per pass | 34 | 30 | 30 | 30 |
| Space Velocity[2] | 250 | 725 | 250 | 2000 |
| Charge, Mol per cent: | | | | |
| $C_4H_8$ | 2.0 | 45.0 | 2.0 | 95.0 |
| $C_4H_{10}$ | 98.0 | 55.0 | 98.0 | 5.0 |
| Product, $C_4$'s Mols/100 Mol Feed to Stage: | | | | |
| $C_4H_6$ | 0.0 | 20.4 | 15.0 | 22.5 |
| $C_4H_8$ | 33.0 | 30.0 | 41.0 | 63.0 |
| $C_4H_{10}$ | 33.0 | 40.0 | 29.0 | 7.0 |
| Overall Efficiency | | 45.0 | | 63.8 |

[1] Defined here as mols $C_4H_8+C_4H_{10}$ decomposed per 100 mols $C_4H_8+C_4H_{10}$ feed to each stage.
[2] Defined as volumes of feed at standard pressure and temperature conditions per volume of catalyst space per hour.

It is to be noted that the actual yield of butadiene in the improved operation is about 18.8% greater. The per cent increase in the yield is about 41.8%.

I claim as my invention:

1. The process which comprises contacting normal butane in a confined reaction zone with an alumina-chromia dehydrogenation catalyst and therein dehydrogenating only a portion of said normal butane to normal butylene and butadiene, the yield of butadiene being from about 10 to about 30 volume percent of the normal butane charged, separating the normal butylene from the butadiene and unconverted normal butane, contacting the thus separated normal butylene in admixture with superheated steam with a dehydrogenation catalyst comprising a composite of a major proportion of magnesia and minor proportions of iron oxide, copper oxide, and potassium oxide, in a separate confined reaction zone and therein dehydrogenating normal butylene to butadiene, and recovering butadiene formed in said zones.

2. A process which comprises introducing normal butane into a first dehydrogenation zone and therein catalytically dehydrogenating only a portion of said normal butane to normal butylene and butadiene, the yield of butadiene being from about 10 to about 30 volume percent of the normal butane charged, separating the normal butylene from the resultant products, introducing the thus separated normal butylene into a second dehydrogenation zone and therein catalytically dehydrogenating normal butylene to butadiene, and recovering butadiene formed in said first and second zones.

3. The process of claim 2 further characterized in that the dehydrogenation in said first reaction zone is effected at a temperature of from about 1050° F. to about 1250° F., an absolute pressure of from about 0.05 atmospheres to about 0.5 atmospheres, and a gaseous hourly space velocity of from about 200 to about 1000, and the dehydrogenation in said second reaction zone is effected at a temperature of from about 1050° F. to about 1250° F., an absolute pressure of from about 0.05 atmospheres to about 0.5 atmospheres, and a gaseous hourly space velocity of from about 200 to about 2000.

4. A process which comprises introducing normal butane into a first dehydrogenation zone and therein catalytically dehydrogenating only a portion of said normal butane to normal butylene and butadiene, the yield of butadiene being from about 10 to about 30 volume percent of the normal butane charged, introducing the resultant reaction products comprising normal butylene, butadiene, and unconverted normal butane into a separation zone and therein separating a butadiene fraction, a normal butane fraction, and a normal butylene fraction, introducing said normal butylene fraction into a second dehydrogenation zone and therein catalytically dehydrogenating normal butylene to butadiene, introducing reaction products from said second zone comprising butadiene, a minor amount of normal butane formed in the second dehydrogenation step, and unconverted normal butylene into said separation zone, recycling said normal butane fraction from said separation zone to said first dehydrogenation zone, and recovering said butadiene fraction.

5. A process which comprises introducing a butane-butylene charging stock and reaction products formed as hereinafter described into a separation zone and therein separating a normal butane fraction and a normal butylene fraction, catalytically dehydrogenating said normal butane fraction to normal butylene and butadiene in a first dehydrogenation zone, the yield of butadiene being from about 10 to about 30 volume percent of the normal butane charged, catalytically dehydrogenating said normal butylene fraction to butadiene in a second dehydrogenation zone, introducing the reaction products from said first and second dehydrogenation zones into said separation zone, and recovering from said separation zone the butadiene formed in said dehydrogenation zones.

CHARLES C. WATSON.

REFERENCES CITED

The following references are of record in the file of this patent:

UNITED STATES PATENTS

| Number | Name | Date |
|---|---|---|
| 2,209,215 | Wiezevich et al. | July 23, 1940 |
| 2,265,641 | Grosskinsky et al. | Dec. 9, 1941 |
| 2,271,670 | Thomas | Feb. 3, 1942 |
| 2,307,240 | Ruthruff | Jan. 5, 1943 |
| 2,313,107 | Chickinoff et al. | Mar. 30, 1943 |
| 2,367,622 | Schulze et al. | Jan. 16, 1945 |
| 2,172,534 | Grosse | Sept. 12, 1939 |
| 2,370,797 | Kearby | Mar. 6, 1945 |
| 2,386,355 | Schulze et al. | Oct. 9, 1945 |

FOREIGN PATENTS

| Number | Country | Date |
|---|---|---|
| 508,764 | Great Britain | July 5, 1939 |